United States Patent [19]

Moon

[11] Patent Number: 4,564,100

[45] Date of Patent: Jan. 14, 1986

[54] CARRIER CONVEYOR SYSTEM

[75] Inventor: Edward E. Moon, Grosse Pointe Woods, Mich.

[73] Assignee: Acco Babcock Inc., Fairfield, Conn.

[21] Appl. No.: 507,054

[22] Filed: Jun. 23, 1983

[51] Int. Cl.$^4$ .................. B65G 43/08; B65G 13/06
[52] U.S. Cl. ........................... 198/341; 198/789;
198/791; 198/465.1; 198/465.3; 104/168;
104/172 B; 104/247
[58] Field of Search .............. 198/339, 341, 472, 780,
198/789, 291, 781, 505; 104/172 B, 168, 135, 247

[56]  References Cited

U.S. PATENT DOCUMENTS

| 2,816,643 | 12/1957 | Klamp | 198/472 |
| 2,938,626 | 5/1960 | Dahms | 198/505 |
| 3,559,793 | 2/1971 | Lange | 198/339 |
| 3,672,486 | 6/1972 | Kennedy et al. | 198/791 |
| 3,871,303 | 3/1975 | Woodling | 104/168 |
| 3,874,302 | 4/1975 | Crosswhite | 198/341 |
| 3,929,079 | 12/1975 | Eliassen | 104/172 B |
| 4,039,075 | 8/1977 | Gray | 104/172 B |
| 4,174,777 | 11/1979 | Riehle | 198/781 |

FOREIGN PATENT DOCUMENTS 2048812 12/1980 United Kingdom .............. 198/791

OTHER PUBLICATIONS

*Material Handling Engineering,* vol. 40, No. 6, Jun. 1985, p. 64.

*Primary Examiner*—Joseph E. Valenza
*Assistant Examiner*—Daniel R. Alexander
*Attorney, Agent, or Firm*—Barnes, Kisselle, Raisch, Choate, Whittemore & Hulbert

[57] ABSTRACT

A carrier conveyor system wherein carriers are disengaged from the main conveyor in advance of a work station and re-engaged beyond the work station and a transfer conveyor is positioned such that it receives the carriers as they are disengaged, transfers them as required to the work station, removes them from the work station after the work is performed and returns them to the main conveyor. The transfer conveyor comprises a plurality of transfer assemblies positioned along each side of the path of the carriers from the area where the carriers are disengaged from the conveyor through the work station and to the area where the carriers are re-engaged with the conveyor. Each transfer assembly comprises a plurality of longitudinally spaced wheels mounted with their axes transverse to the path of the carriers. The rollers are driven continuously when it is desired such that the carrier is moved by each transfer assembly to the succeeding transfer assembly or position. The number of transfer assemblies is such that there will be sufficient time at the work station to perform the function desired and at the same time there will always be a carrier ready for re-engagement with the conveyor thereby insuring that there will be a carrier at each longitudinally spaced drive position on the main conveyor in the remainder of the conveyor system.

22 Claims, 16 Drawing Figures

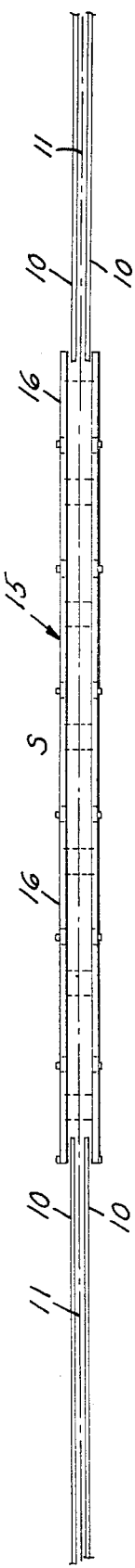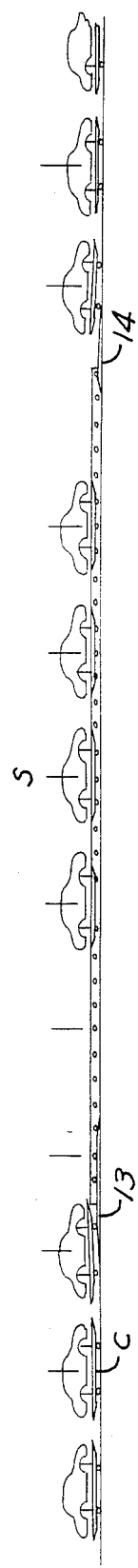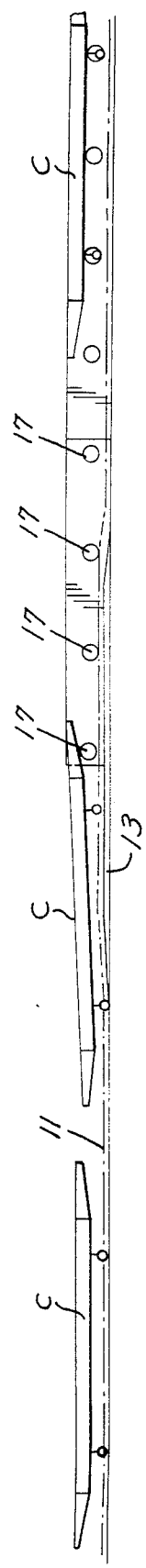

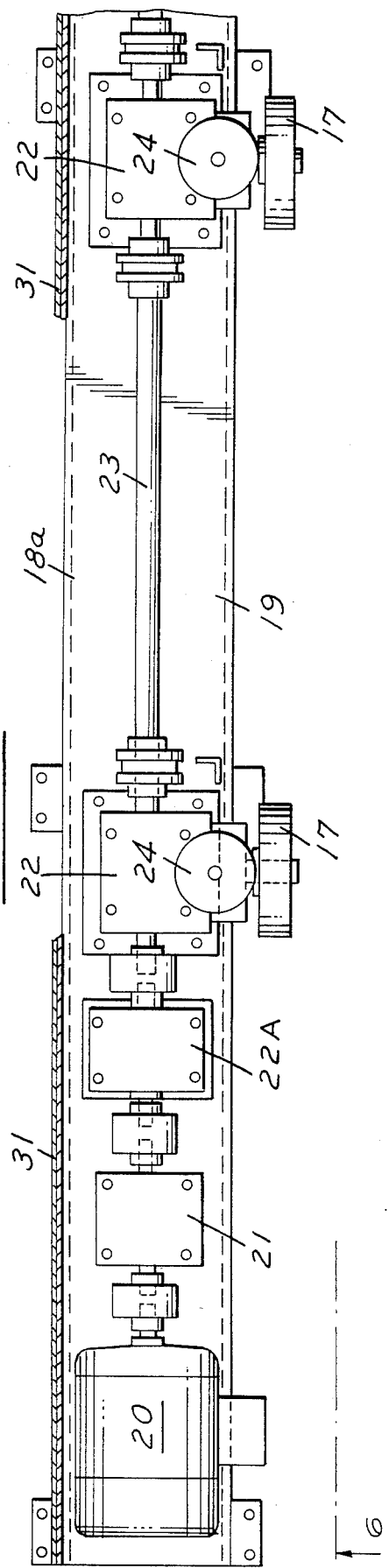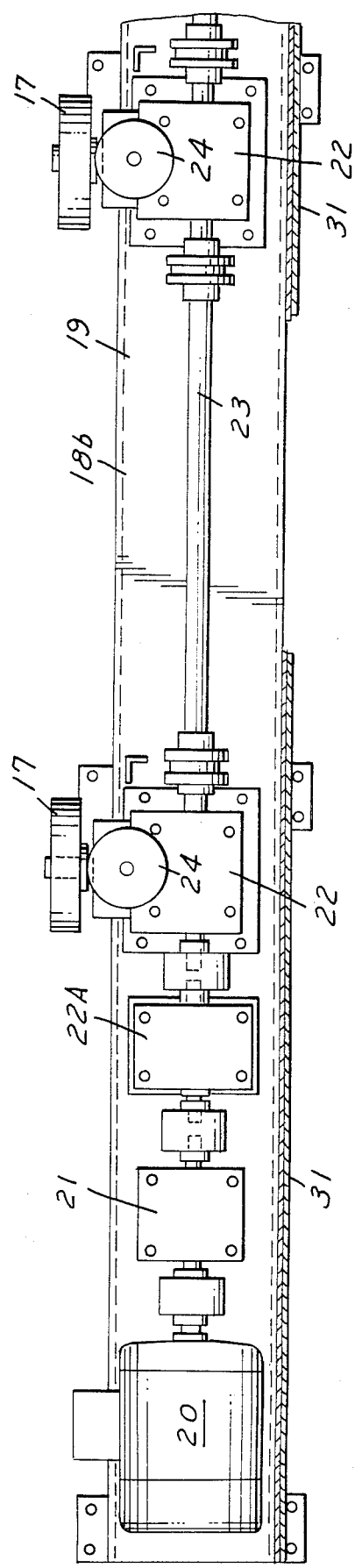
FIG.4A

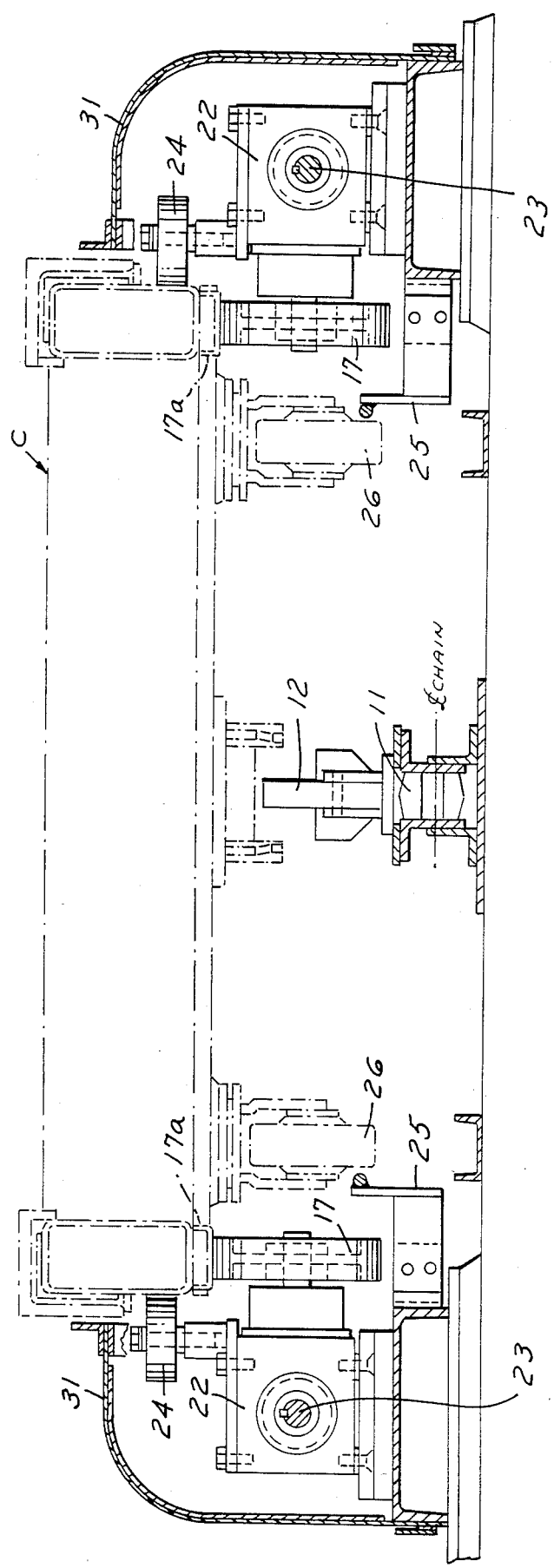

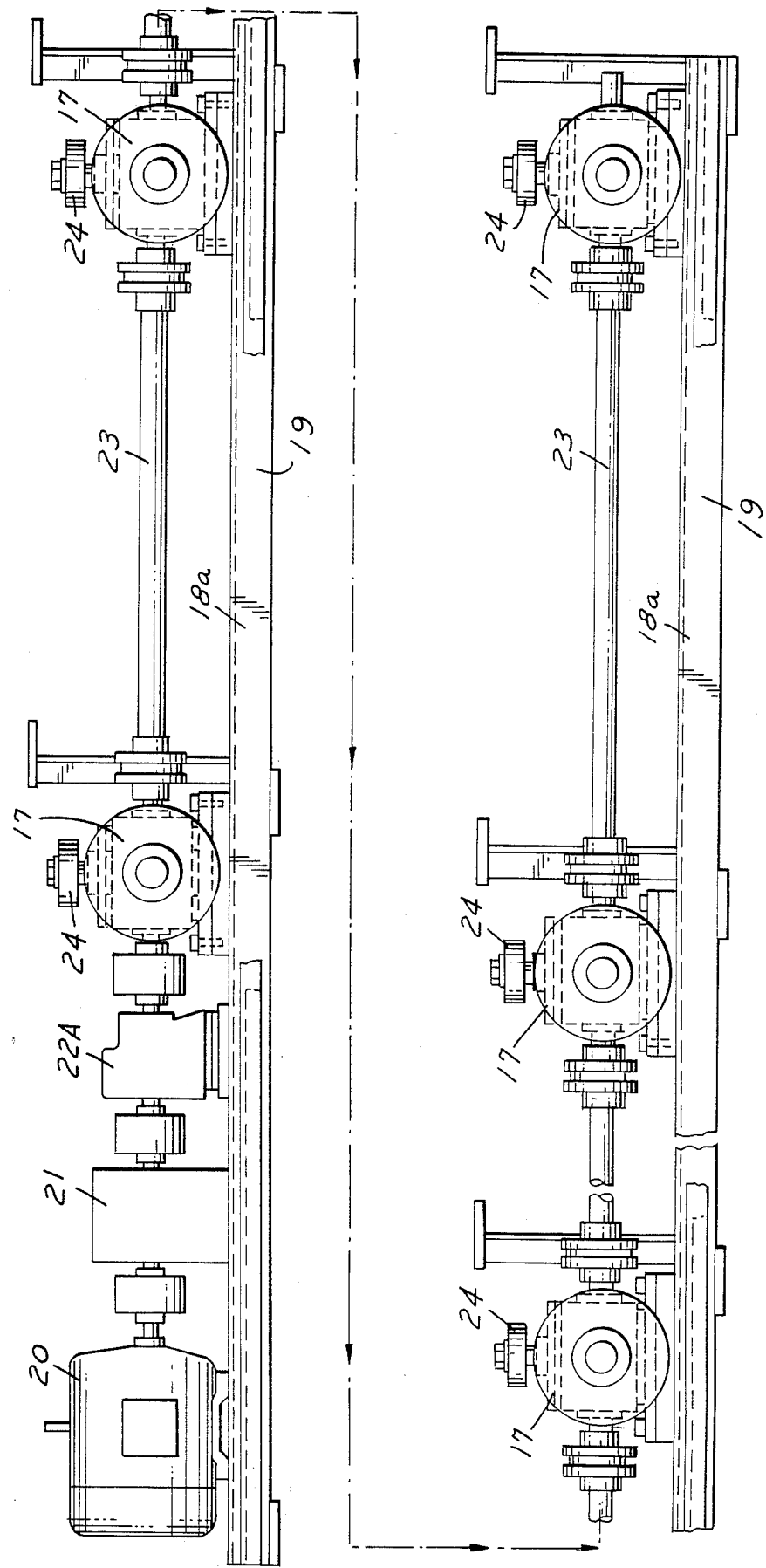

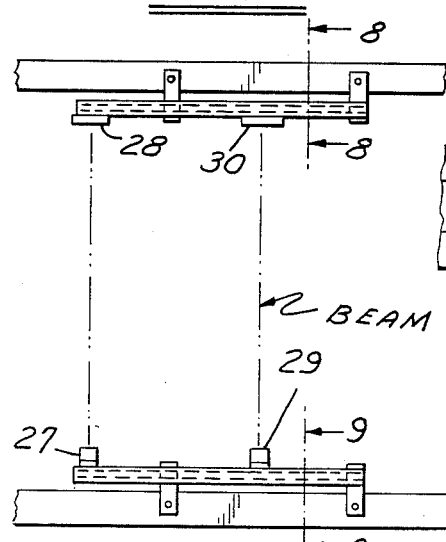
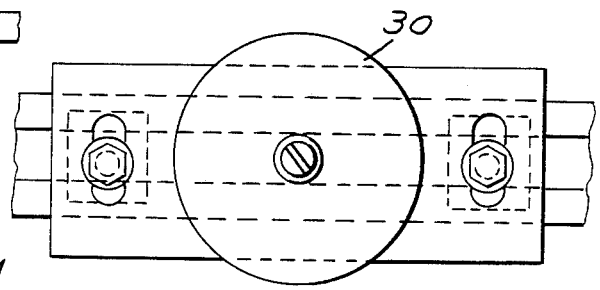
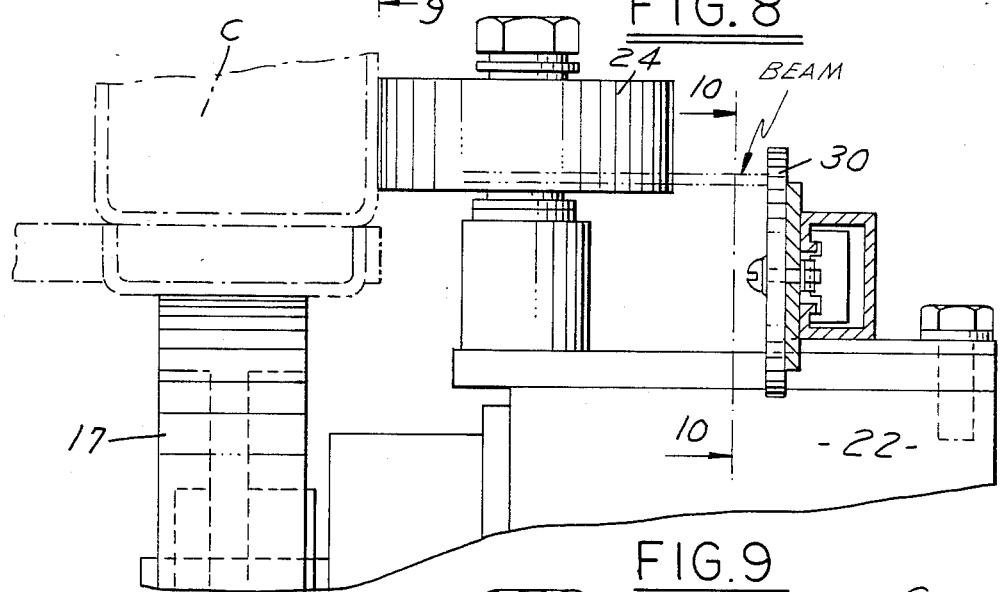
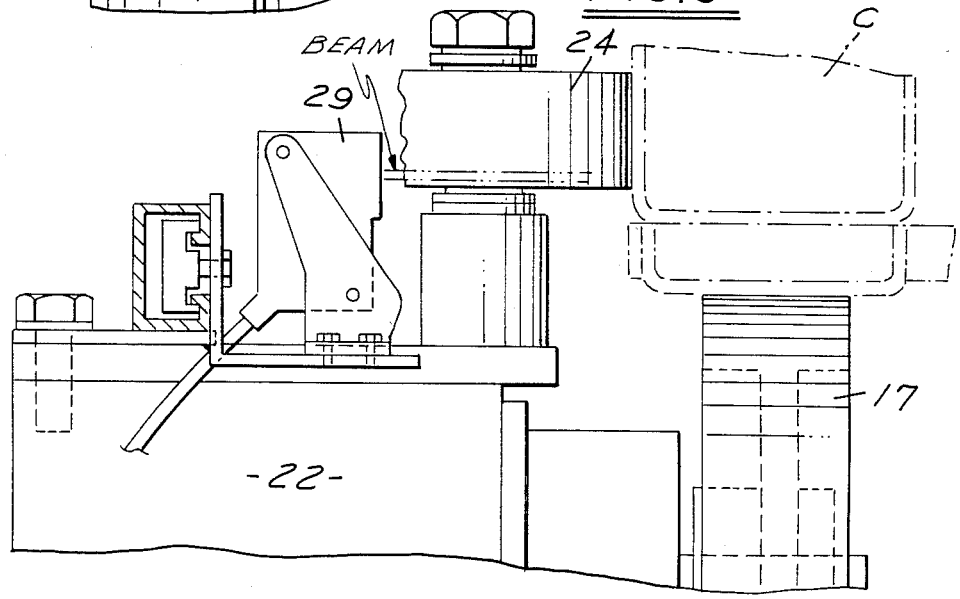

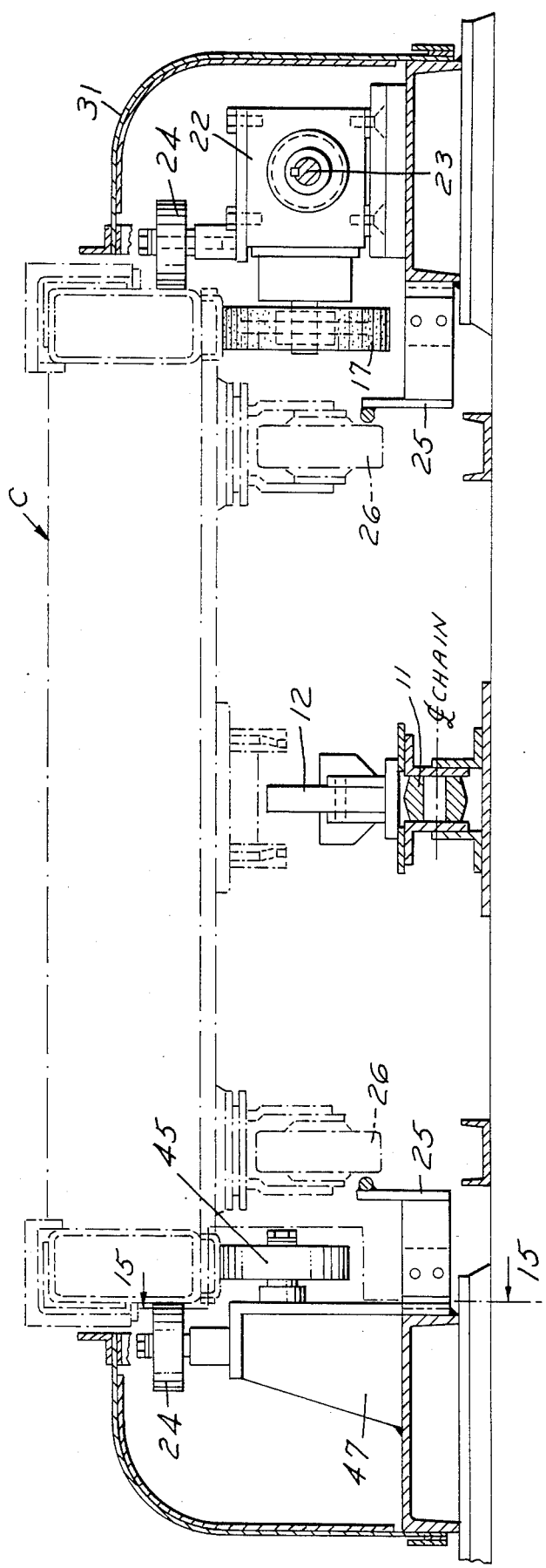

CARRIER CONVEYOR SYSTEM

This invention relates to carrier conveyor systems and particularly to conveyor systems wherein a plurality of carriers are normally moved continuously in a predetermined path along which workers perform various work functions on the work carried by the carriers.

BACKGROUND AND SUMMARY OF THE INVENTION

A common and well known type of carrier conveyor system comprises a plurality of work carriers, such as wheeled carriers or skids, which are moved along a predetermined path by a main conveyor underlying and engaging the carriers. As the carriers are moved along, workers commonly perform various work functions on the work carried by the carriers. Thus, for example, workers may apply or work upon portions of an automobile body supported by the carriers. In order to obtain optimum efficiency, the carriers are placed in closely spaced longitudinally spaced relation to one another. In such systems, the carrier can be removed from engagement with the main conveyor as may be required.

With the advent of machines such as robots, it is desirable to be able to perform some work functions on the work by the use of such machines. However, such machines may necessitate interruption of the movement of the work carrier for a predetermined period of time and thus the work carrier must be disengaged from the main conveyor. After the work is performed by the machine, the carrier is re-engaged with the main conveyor. Once again to insure optimum efficiency, the carrier must be removed from engagement with the main conveyor and returned to engagement with the main conveyor quickly without the loss of longitudinal spacing on the main conveyor.

Robotic work stations can be inserted into manned assembly or main conveyors either by making the robot mobile (as a human worker) or by providing sufficient accumulation ahead of and behind the robot to provide for a fixed work station. The second method is often preferable because of the much lower cost and better performance level of the robotic equipment.

An excessively long distance is required to provide work time on a slow moving close job spaced conveyor, as is common in the automotive industry. It is therefore, desirable to provide some intervening means of speeding the flow of product (jobs) without disrupting the normal operation of the conveyor. Such a conveyor device should reduce the space and time required to a practical minimum.

Many methods of high speed castered truck transfer have been devised; however, they all have one or more of the following deficiencies:
- The trucks are moved on their own casters at high speed, causing fast deterioration.
- High noise level.
- A high truck modification cost.
- Reciprocating devices which cause lost time and additional motion and wear.
- An assortment of auxiliary equipment and numerous controls are required.
- Floor pits or a significant conveyor elevation changes are required. The latter usually results in long ramps resulting in wasted plant space.
- Relatively high maintenance requirements.

As an example, mechanisms have been heretofore proposed for such transfer of the carriers to and from the work station including mechanical and hydraulic devices for grasping the carrier, transferring it to the work station and returning it to the main conveyor. Such devices have been complex and costly to build and maintain.

Accordingly, among the objectives of the present invention are to provide a conveyor system which will remove a work carrier from engagement with the main conveyor, transfer it to the work station, and return it from the work station to the conveyor in the shortest possible distance while making it possible to maintain a proper supply of carriers in advance of and beyond the work station to insure that the remainder of the system has a carrier at each drive position of the main conveyor; which has a low profile; which is accessible for service; which provides ready access to the work station; which is in the normal path of the conveyor; which is low in in cost; which is modular and can be adapted to various systems; which provides a degree of redundancy to permit operation even if a portion of the system malfunctions; which functions without substantial lifting of the carrier; which requires minimal change in the construction of the main conveyor; which requires minimal change, if any to the work carrier; and/or which can be retrofitted to conventional carrier systems.

This invention directs itself to providing a solution to the requirements for a robotic work station, while avoiding the deficiencies of the other available methods. However, because of its low cost and versatility of arrangement, it has excellent utility for handling a variety of racks, skids or other products. It can be arranged in systems of varying size or used as a single section wherever only high speed transfer is required.

In accordance with the invention, means are provided for disengaging the carriers from the main conveyor in advance of the work station and re-engaging the carriers beyond the work station. A transfer conveyor is positioned such that it receives the carriers as they are disengaged, transfers them as required to the work station, removes them from the work station after the work is performed and returns them to the main conveyor. The transfer conveyor comprises a plurality of transfer assemblies positioned along each side of the path of the carriers from the area where the carriers are disengaged from the conveyor through the work station and to the area where the carriers are re-engaged with the conveyor. Each transfer assembly comprises a plurality of longitudinally spaced wheels mounted with their axes transversely of the path of the carriers and adapted to engage the underside of the carriers. The wheels are driven continuously when it is desired such that the carrier is moved by each transfer assembly to the succeeding transfer assembly or position. The number of transfer assemblies is such that there will be sufficient time at the work station to perform the function desired and at the same time there will always be a carrier ready for re-engagement with the conveyor thereby insuring that there will be a carrier at each longitudinally spaced drive position on the main conveyor in the remainder of the conveyor system.

DESCRIPTION OF THE DRAWINGS

FIG. 1 is a partly diagrammatic plan view of a typical conveyor system embodying the invention.

FIG. 2 is a partly diagrammatic plan view of a typical system.

FIG. 3 is a fragmentary elevational view of a portion of the system.

FIGS. 4A and 4B are fragmentary plan views of transfer assemblies utilized in the conveyor system.

FIG. 5 is a transverse sectional view of a transfer assembly.

FIG. 6 is an elevational view of a transfer assembly.

FIG. 7 is a partly diagrammatic view of a sensing system utilized in the conveyor system.

FIG. 8 is a fragmentary sectional view on an enlarged scale taken along the line 8—8 in FIG. 7.

FIG. 9 is a fragmentary sectional view on an enlarged scale taken along the line 9—9 in FIG. 7.

FIG. 10 is a fragmentary view taken along the line 10—10 in FIG. 8.

FIG. 14 is a sectional view of a portion of an alternate transfer system.

DESCRIPTION

Figure 4B:
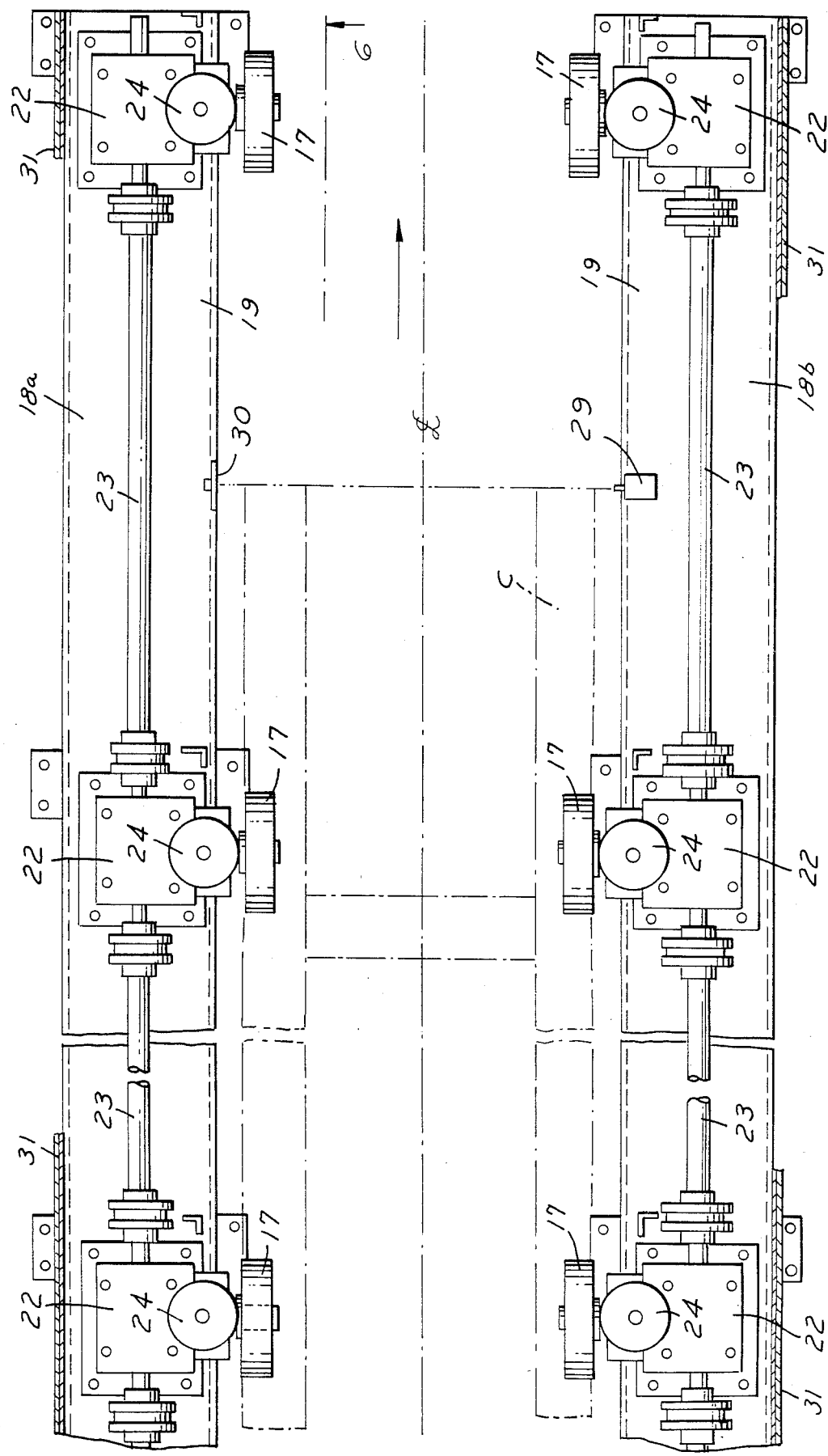

Referring to FIGS. 1 and 2, the invention relates to a conveyor system which comprises a plurality of load carriers C which are adapted to be moved along a predetermined path for work to be performed on the articles supported by the carriers by workers as the carriers are moved along the path. In a typical arrangement, the carriers C comprise wheeled trucks that are guided by tracks 10 and driven by a main or process chain conveyor 11 having longitudinally spaced pushers engaging the trucks C, a truck C being engaged with each pusher.

Where it is desired to perform a work function with the carrier stopped at one or more work stations S, the carriers must be disengaged from the main conveyor, transferred to the work station S where the carrier C remains for a predetermined period of time sufficient to perform the work function and returned to the main conveyor 11. In order to insure that there will be a carrier C at each drive or pusher position on the main conveyor 11 in the remaining part of the system, the present invention provides for rapid disengagement and transfer of a minimum number of carriers generally along the path of the main conveyor.

In accordance with the invention, provision is made for disengagement of the carriers from the main conveyor in advance of the work station and re-engagement of the carriers with the main conveyor beyond the work station as by a first inclined track or ramp 13 that moves the carriers upwardly to the level of the transfer in advance of the work station and a second inclined track or ramp 14 that guides the carriers downwardly to the level of the main conveyor 11 beyond the work station. If the main conveyor is at a sufficient elevation, the ramps may not be required.

Further, in accordance with the invention, a transfer conveyor 15 is positioned between the two ramps for successively moving the carriers rapidly. The transfer conveyor comprises a plurality of transfer assemblies 16 positioned along each side of the path of the conveyor. Each assembly includes a plurality of longitudinally spaced wheels 17 mounted with their axes transversely of the path of the carriers C and adapted to engage the underside of the carriers C adjacent the longitudinal sides of the carriers C. The wheels 17 in each assembly are driven continuously when the drive is energized so that the transfer assembly 16 will move the carrier C longitudinally to the next transfer assembly 16 or the ramp 14, in the case of the last transfer assembly.

Referring to FIGS. 4A, 4B, 5 and 6, each transfer assembly 16 comprises a pair of transfer mechanisms 18a, 18b in spaced relation, one being the mirror image of the other. Each mechanism 18a, 18b includes a longitudinally extending base member 19, a motor 20 mounted on the base member, and a clutch-brake 21 mounted on the base member and interconnected with the motor 20. A plurality of right angle gear units 22 are also mounted on the base member and support and drive the rollers 17. One of the right angle gear units 22 is connected to a gear reducer 22a which in turn is connected to the clutch-brake 21 and the remainder of the gear units 22 are interconnected by a plurality of shafts 23. The gear units 22 also support guide rollers 24 which have their axes extending vertically for engagement with the sides of the carriers to guide the carriers laterally (FIG. 5). In this fashion, the opposed transfer mechanisms or units 18a, 18b function to move the carriers C longitudinally along the path of the main conveyor. Guides 25 are mounted along the base engaging the swivel wheels or casters 26 and preventing rotation thereof into the path of the rollers 17. The guides can be mounted on the floor or comprise extensions of the portion of tracks along the floor in the transfer zone. Where the carriers do not provide a smooth underside, bars 17a may be provided on the underside of the carrier.

Sensing means are provided along the path of the carrier in each transfer assembly to control the operation of the clutch-brakes 21. As shown in FIGS. 7-10, this comprises a first sensor 27 such as a photocell that functions to emit a beam across the path of the carriers C which is reflected by a reflector 28 back to the sensor and a second sensor 29 similarly directing a second beam toward a second reflector 30. The first sensor 27, 28 functions to control deceleration of the carrier and the second sensor 29, 30 functions to control the stopping of the carrier.

As shown in FIG. 5, covers 31a overlie the shafts and drive machinery. The area alongside the assemblies 18a, 18b is free and unobstructed and has a low profile allowing a clear area for working and for devices required at the work station.

Thus, as an example, it is possible to insert a relatively fixed robotic work station into an assembly or main conveyor which uses carriers C such as four wheeled trucks to carry the work or product. These trucks C are towed by dogs 12 on a main conveyor 11 movable along the floor. The trucks C are on job spaces somewhat longer than the trucks C themselves. The system functions to detach the trucks C from the conveyor 11 without disturbing its normal operation, support the truck C so that it can be transferred at high speed toward the work station S, stop the truck C at each station S, and return the truck C to the main conveyor 11 immediately behind the previous one so that there are no vacant job spaces, meanwhile providing the necessary work and saftey time at the robotic station.

The invention provides all of these requirements while using a common mechanism unit of conveyor at each station. Each unit has the following:

A drive unit on each side which normally operates as left and right pairs but which can be operated singly.

A clutch-brake unit for free wheeling, for detaching, attaching and positioning and controlled start and stop.

A series of drive wheels operated by the in-line drive through a series of right angle gear units and connecting shafts.

A series of side guide rollers.

Other necessary caster guides and guards.

A stopping and truck presence control actuator(s).

When the several sections are incorporated as a system in conjunction with a towing conveyor, the towing conveyor is ramped slightly as at 13, 14 at the first and last sections to provide means of transferring the truck C from its own wheels to the high-speed transfer conveyor. These areas are also provided with controls to protect against over-filling prior to the work station or after the work station.

The brake mechanism in the drive provides an adjustable means of controlling acceleration or deceleration. This allows for maximum acceleration to top speed without slipping between the drive wheels and the truck frame. Deactivation of the clutch permits overrunning or free wheeling. The feature is required on all entrance and exit units which interface with slower moving conveyors. It also permits manually moving the carrier in the event of equipment failure and allows fine positioning by an appropriate apparatus at the work station.

Inasmuch as the product may not be located precisely on the carriers and the carriers themselves may not be precise, locating of the product may ordinarily be only approximate. Stopping is accomplished by first braking gradually to a low speed and then braking quickly to a set stop point. The level of accuracy is sufficient for use with robots that have a vision or part locator system.

The drive mechanism can be constructed of any of a number of conventional components. The combination selected, however, must provide for acceleration, deceleration, and in most instances, be free wheeling. The actual equipment will be determined mainly by the required accuracy of product location after a stop. The invention contemplates using an in-line drive so as to minimize the use of floor space.

The essential component of the unit (other than the drive) is the series of interconnected drive wheels or rollers on each side of the unit. These wheels are spaced regularly at a distance (related to the product length) that will assure adequate driving force and smooth operation. The wheels are mounted on the output shaft of right angle gear boxes. The boxes are interconnected to each other and to the drive by appropriate couplings and torque shafts.

The drive wheels can be constructed of different adequate materials; however, the invention contemplates the use of a specially constructed wheel, the drive surface of which is composed of compressed canvas. They must provide a high resistance to damage yet be resilient enough to drive effectively and quietly. The drive or support wheels are augmented by side guide rollers.

The right angle construction provides for a compact arrangement which minimizes the amount of floor space required at each side of the conveyor. Since the right angle gear units also provide the bearing support for each wheel, the total elevation is only that of the wheel plus any necessary structural support.

The drive wheels can be located in an opposing or alternating fashion. In addition, non-powered idler wheels may be located between the powered wheels. Side guide roller spacing is an option but is at no greater spacing than the drive wheels.

Guards are required over the rotating mechanisms. These are, however, removable and once removed, leave all elements exposed for maintenance. On some units continuous guides 26 are required to prevent the truck casters from contacting the drive wheels. They do not affect the design or operation of the unit.

Each section of the transfer ordinarily has two controls or sensors actuated by the carrier. The first is located several feet (typically 4) from the other and sufficiently far from the end so that the carrier can be stopped approximately in the center of the section. The first control activates the deceleration cycle, the second activates the full braking effort for accurate stopping. Where precise positioning is required, an auxiliary locator would be activated after the stop cycle is completed.

A transfer system consists of any number of units depending on the number of work stations and the amount of accumulation desired before and after each work station. A typical system would have seven stations (sections) as follows:

Receiving (detach)
Wait (before unit-2)
Work
Wait (after work-2)
Return (attach)

Each station having a load will automatically advance the load to the next station if the next station is empty or if that station too is in position to advance its load. On need to advance, the stations with a load and the one(s) to receive a load will speed up, advance the load, slow down, and stop.

On a seven station unit the usual condition is to have a load in the work station and in the two wait stations after the work station. The two wait stations ahead of the work station are generally empty, the one before the work station receives a load just prior to the time the work station is cleared. The receive and return stations have loads in various stages of approaching or leaving.

As long as the work station is operating properly (is completing all work prior to the time for a shift) and as soon as the return station is clear, the two wait stations after the work station, the work station, and the wait station ahead will all advance as a group.

This action brings a new load into the work station and refills the return section.

Loads approaching the receiving (detach) station pass a detector. If the receiving station is available, the main conveyor (typically chain-on-edge) is permitted to continue running. If the station is not clear, the main conveyor will stop until it is clear.

The load entering the station is under the control of the main conveyor until it is safely into the receiving station. The load is raised slightly by ramping the main conveyor up. The amount of lift is just enough to get the underside of the load above the level with the drive wheels. As soon as the front edge of the load is over the first row of drive wheels, the main conveyor track is dropped away, leaving the load resting on the transfer conveyor. The load is pushed safely onto the first section by the main conveyor chain. The wheels or rollers are free to rotate as the load is moved at the main conveyor speed. When the load is safely in position, the process chain is also lowered so that the pusher dogs do not contact any part of the carrier. The load is now free to be advanced at high speed.

The action at the return (attach) station is the reverse of the above. Near the exit end of this station the main conveyor chain is raised until it is as the proper towing level, then the process conveyor track is raised until it is in contact with the carrier. This level is maintained until the load is clear of the return section where it can be ramped down to its original level or any other level.

A dog or conveyor position sensor would be used to indicate that the return section is clear so that a new load can be advanced. An additional sensor will shut down the main conveyor if a load is not properly on the return station and the main conveyor pusher dog is nearing the position for picking up the load. The main conveyor will remain stopped if a load does not arrive.

Figure 11:
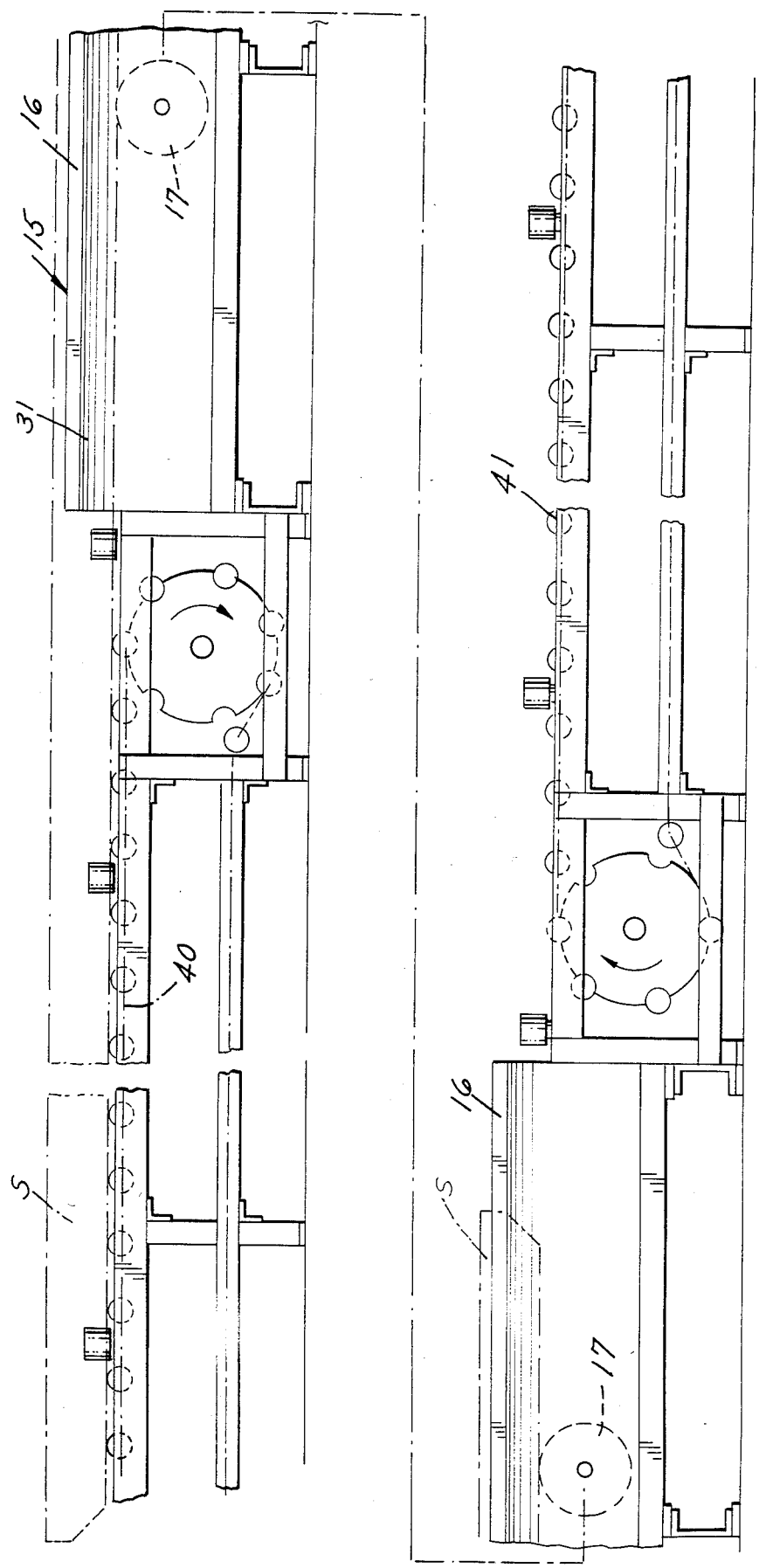
FIG. 11 is a fragmentary side elevational view of another typical form of carrier conveyor system.
Figure 12:
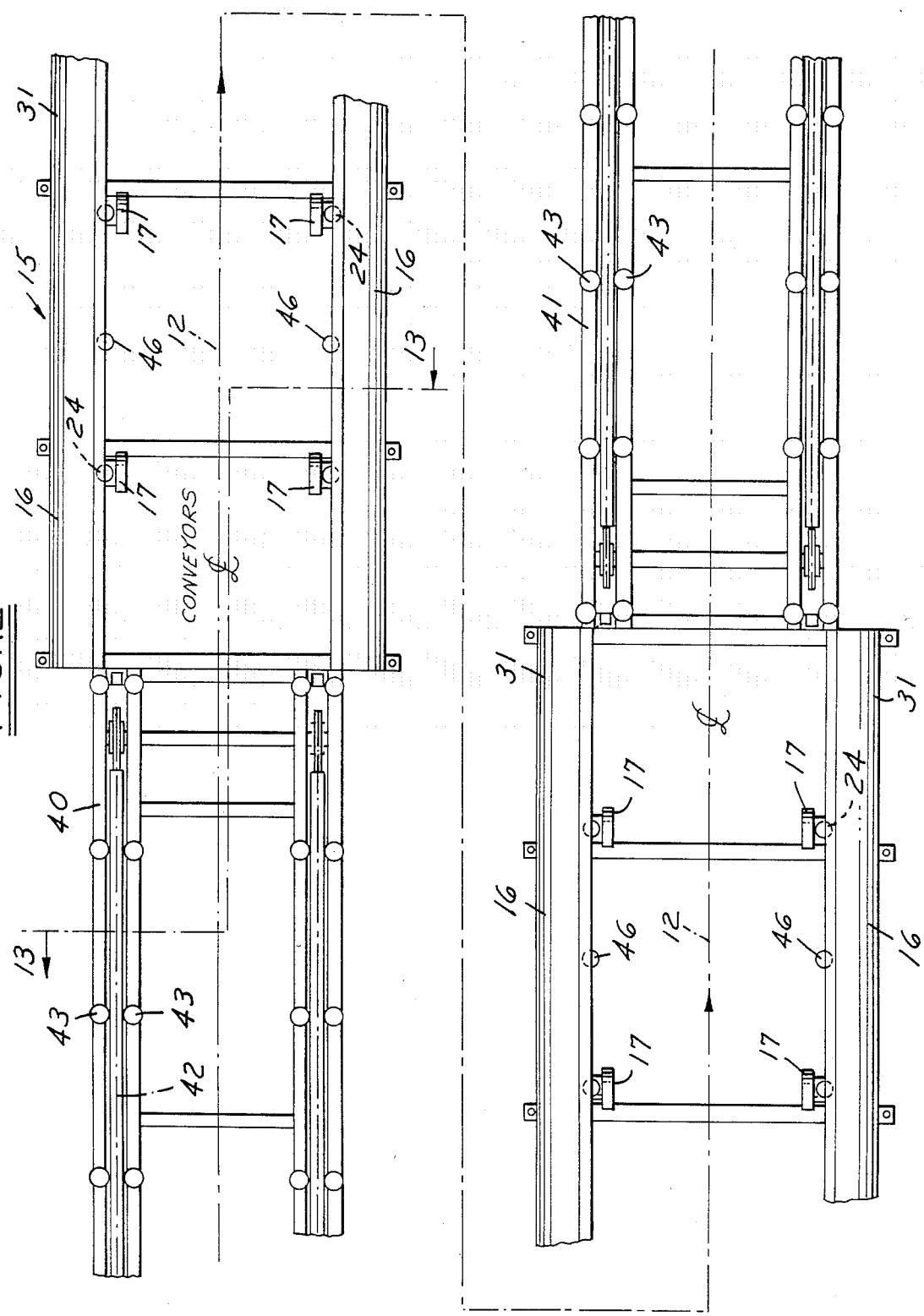
FIG. 12 is a fragmentary plan view of the system shown in FIG. 11.
Figure 13:
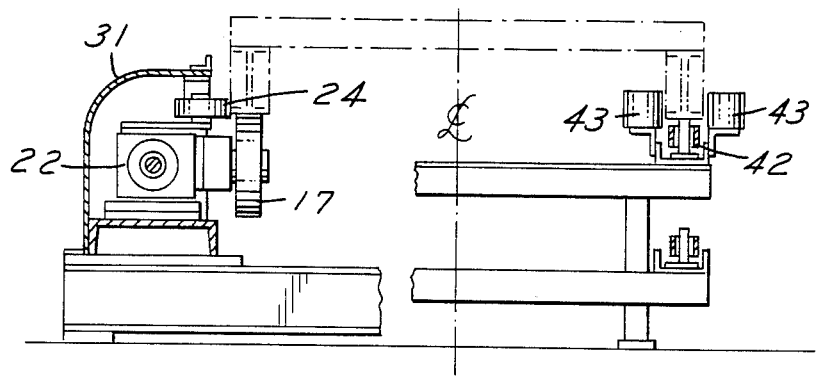
FIG. 13 is a fragmentary sectional view taken along the line 13—13 in FIG. 12.

A modified form of the carrier conveyor system is shown in FIGS. 11-13 wherein the carriers comprise skids S and the conveyors include rollers for supporting and guiding the skids. As shown in FIGS. 11 and 12, a first carrier 40 brings the skids S to the transfer conveyor and a second conveyor 41 receives the skids S from the transfer conveyor. The transfer conveyor comprises a plurality of transfer assemblies as in the prior form of the invention. The conveyors 40, 41 are of conventional construction and include chains 42 that engage the skid and guide rollers 43 that guide the skid.

Figure 15:
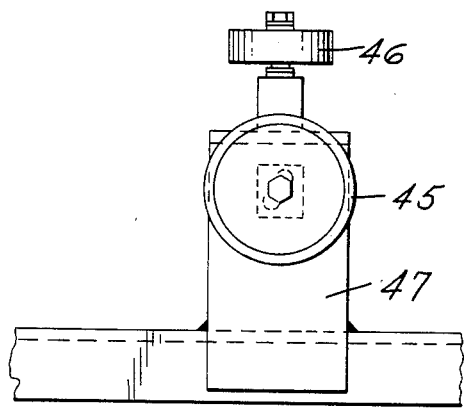
FIG. 15 is is fragmentary view taken along the line 14—14 in FIG. 14.

Referring to FIGS. 14 and 15, it is possible to provide power on only one side of the carrier by providing idler rollers on the other side of the carriers. Thus, as shown in FIGS. 14 and 15, idler rollers 45 can be provided at longitudinally spaced points in place of the drive rollers and lateral guide rollers 46 can also be provided on the same support 47.

I claim:

1. A carrier conveyor system comprising
   a main conveyor,
   a plurality of carriers positioned in closely spaced relation on said main conveyor,
   said main conveyor having means in closely spaced relation for engaging and moving said carriers,
   a work station at which a carrier is to be stopped to perform a work function,
   said main conveyor having a first portion in advance of the work station and a second portion beyond the work station,
   means defining a first track associated with the first portion of the main conveyor along which the carriers are movable,
   means defining a second track associated with the second portion of the main conveyor along which the carriers are movable,
   means associated with the first track and first portion of the conveyor for successively disengaging the carriers from the first portion at the end of the first portion and disengaging the carriers relative to the first track,
   means associated with the second track and the second portion for successively re-engaging the carriers with the second portion and the second track, and a transfer conveyor between the end of said first track and said second track for transferring the carriers to the work station, removing the carriers from the work station and returning the carriers to the second track,
   said transfer conveyor comprising a plurality of pairs of closely spaced transfer assemblies, one on each side of the path of the carriers from the first track to the work station and to the second track, at least a first transfer assembly at a first station being provided between the first track and the work station, a second transfer assembly being provided at the work station, and at least a third transfer assembly being provided at a third station between the work station and the second track,
   each transfer assembly comprising a plurality of longitudinally spaced wheels mounted with their axes transverse to the path of the carriers and adapted to engage the underside of a carrier adjacent the longitudinal sides of the carrier,
   the space between said wheels on one side of the path of a carrier and the wheels on the other side of said path of a carrier being substantially unobstructed,
   motor means individual to each said transfer assembly for driving the wheels of each transfer assembly on at least one side of the path of the carriers,
   each motor means for driving the wheels of each first and third transfer assembly being operable independently of the other and of the main conveyor to accelerate a carrier thereon to a speed higher than the speed of the main conveyor, and thereafter to decelerate the carrier and to permit free wheeling or braking of the carrier on each transfer assembly,
   each motor means for driving the wheels of each second transfer assembly at said work station being operable independently of the other and of the main conveyor to accelerate a carrier thereon to a speed higher than the speed of the main conveyor, and thereafter to decelerate the carrier and to permit braking of the carrier on each transfer assembly,
   said first track being positioned such that the first portion of the conveyor delivers a carrier to the wheels of the first transfer assembly adjacent to the first track so that the motor means of the first transfer assembly can be operated to accelerate the carrier and rapidly move the carrier onto the first transfer assembly,
   said second track being positioned such that the wheels of the third transfer assembly adjacent the second track deliver a carrier to the second track,
   the number of transfer assemblies being such that a carrier will be returned to the main conveyor so that there are no vacant spaces between the closely spaced carriers on the main conveyor while providing necessary work and safety time at the work station.

2. The conveyor system set forth in claim 1 including means for starting and stopping the drive of each set of wheels in each transfer assembly independently of the other transfer assembly,
   and means for controlling the operation of said drive means such that the wheels of one transfer assembly will not be driven if a carrier is present in a succeeding transfer assembly.

3. The conveyor system set forth in claim 1 wherein said motor is continuously driven and including a clutch-brake interposed between the motor and the wheels.

4. The conveyor system set forth in claim 3 wherein each said transfer assembly includes a plurality of longitudinally spaced gear units, shafts interconnecting said gear units, a wheel associated with each gear unit, and one of said gear units being connected to said clutch-brake.

5. The conveyor system set forth in claim 4 wherein guide rollers are mounted on said gear units.

6. The conveyor system set forth in claim 1 wherein at least one said transfer assembly comprises a longitudinally extending base member, a motor mounted on said base member, a clutch-brake mounted on said base member and interconnected to said motor, a plurality of right angle gear units mounted on said base member, one of said gear units being connected to said clutch-brake, a plurality of shafts interconnecting said gear units, and one of said wheels being mounted on each said gear unit.

7. The conveyor system set forth in claim 6 wherein a guide roller is provided on each said gear unit.

8. The conveyor system set forth in claim 1 wherein said carriers comprise wheeled trucks, said first and second tracks extending along the floor and engaged by said wheels,
said means for disengaging said trucks from said first conveyor portion comprising a first upwardly inclined track,
said means for re-engaging said trucks with said second track portion comprising a second downwardly inclined track portion,
said first and second portions comprising parts of a single main conveyor,
said main conveyor being guided along said first and second inclined portions but being depressed between the transfer assemblies substantially along the floor in the area between said first and second track portions and through the work station.

9. The conveyor system set forth in claim 8 including means for guiding the wheels of said trucks as they are moved through the transfer conveyor to prevent the wheels from moving or turning laterally into the path of the drive wheels.

10. The conveyor system set forth in claim 2 wherein said control means comprises a sensor at the first track portion, a sensor at the second track portion, and sensors associated with each transfer assembly.

11. The conveyor system set forth in claim 1 wherein a pair of sensors are provided at each transfer assembly, and means associated with the first sensor for controlling the deceleration of the carrier, and means associated with the second sensor for controlling the stopping of the carrier.

12. The conveyor system set forth in claim 1 wherein said main conveyor comprises a chain conveyor, said carriers comprise skids supported by and moved by said chain conveyor, said first portion of the conveyor being associated with the transfer conveyor such as to deliver a carrier to the transfer assemblies nearest the first portion, said second portion of the conveyor being associated with said transfer conveyor such as to receive a carrier from the nearest transfer assembly.

13. For use in a carrier conveyor system comprising a main conveyor, a plurality of carriers positioned in closely spaced relation on said main conveyor, said main conveyor having means in closely spaced relation for engaging and moving said carriers, a work station at which a carrier is to be stopped to perform a work function, said main conveyor having a first portion in advance of the work station and a second portion beyond the work station, the improvement comprising
means defining a first track associated with the first portion of the main conveyor along which the carriers are movable,
means defining a second track associated with the second portion of the main conveyor along which the carriers are movable,
means associated with the first track and first portion for successively disengaging the carriers from the first portion at the end of the first portion and disengaging the carriers relative to the first track,
means associated with the second portion and the second track for successively re-engaging the carriers with the second portion and second track, and
a transfer conveyor between the end of said first track and said second track for transferring the carriers to the work station, removing the carriers from the work station and returning the carriers to the second track,
said transfer conveyor comprising a plurality of pairs of transfer assemblies, one on each side of the path of the carriers through the work station, at least a first transfer assembly at a first station being provided between the first track and the work station, a second transfer assembly being provided at the work work station, and at least a third transfer assembly being provided at a third station between the work station and the second track,
each transfer assembly comprising a plurality of longitudinally spaced wheels mounted with their axes transverse to the path of the carriers and adapted to engage the underside of a carrier adjacent the longitudinal sides of the carrier,
the space between said wheels on one side of the path of a carrier and the wheels on the other side of said path of a carrier being substantially unobstructed,
motor means individual to each said transfer assembly for driving the wheels on at least one side of the path of the carriers,
each motor means for driving the wheels of each first and third transfer assembly being operable independently of the other and of the main conveyor to accelerate a carrier thereon to a speed higher than the speed of the main conveyor, and thereafter to decelerate the carrier and to permit free wheeling or braking of the carrier on each transfer assembly,
each motor means for driving the wheels of each second transfer assembly at said work station being operable independently of the other and of the main conveyor to accelerate a carrier thereon to a speed higher than the speed of the main conveyor, and thereafter to decelerate the carrier and to permit braking of the carrier on each transfer assembly,
said first track being positioned such that the first portion of the conveyor delivers a carrier to the wheels of the first transfer assembly adjacent to the first track so that the motor means of the first transfer assembly can be operated to accelerate the carrier and rapidly move the carrier onto the first transfer assembly,
said second track being positioned such that the wheels of the third transfer assembly adjacent the second track deliver a carrier to the second track,
the number of transfer assemblies being such that a carrier will be returned to the main conveyor so that there are no vacant spaces between the closely spaced carriers on the main conveyor while providing necessary work and safety time at the work station.

14. The transfer conveyor set forth in claim 13 including means for starting and stopping the drive of each set of wheels in each transfer assembly independently of the other transfer assembly, and means for controlling the operation of said drive means such that the wheels of one transfer assembly will not be driven if a carrier is present in a succeeding transfer assembly.

15. The transfer conveyor set forth in claim 13 wherein said motor is continuously driven and including a clutch-brake interposed between the motor and the wheels.

16. The transfer conveyor set forth in claim 15 wherein each said transfer assembly includes a plurality of longitudinally spaced gear units, shafts interconnecting said gear units, a wheel associated with each gear unit, and one of said gear units being connected to said clutch-brake.

17. The transfer conveyor system set forth in claim 16 wherein guide rollers are mounted on said gear units.

18. The transfer conveyor set forth in claim 1 wherein at least one said transfer assembly comprises a longitudinally extending base member, a motor mounted on said base member, a clutch-brake mounted on said base member and interconnected to said motor, a plurality of right angle gear units mounted on said base member, one of said gear units being connected to said clutch-brake, a plurality of shafts interconnecting said gear units, and one of said wheels being mounted on each said gear unit.

19. The conveyor system set forth in claim 18 wherein a guide roller is provided on each said gear unit.

20. The conveyor system set forth in claim 13 wherein said carriers comprise wheeled trucks, tracks extending along the floor, means for guiding the wheels of said trucks as they are moved through the transfer conveyor to prevent the wheels from moving or turning laterally into the path of the drive wheels.

21. The carrier conveyor system set forth in claim 1 wherein the number of transfer assemblies comprises at least five, said first transfer assembly defining a receiving assembly for receiving a carrier from the first portion and first track of the main conveyor, a fourth transfer assembly at a fourth station defining a wait assembly in advance of the work station, a fifth transfer assembly at a fifth station defining a wait assembly downstream from the work station, and said third transfer assembly defining a return assembly for delivering a carrier to the second portion and second track of the main conveyor.

22. The transfer conveyor set forth in claim 13 wherein the number of transfer assemblies comprises at least five, said first transfer assembly defining a receiving assembly for receiving a carrier from the first portion and first track of the main conveyor, a fourth transfer assembly at a fourth station defining a wait assembly in advance of the work station, a fifth transfer assembly at a fifth station defining a wait assembly downstream from the work station, and said third transfer assembly defining a return assembly for delivering a carrier to the second portion and second track of the main conveyor.

* * * * *